United States Patent
Hofer et al.

(10) Patent No.: US 11,063,460 B2
(45) Date of Patent: Jul. 13, 2021

(54) BATTERY SYSTEM

(71) Applicant: Samsung SDI Co., Ltd., Yongin-si (KR)

(72) Inventors: Maximilian Hofer, Hartberg (AT); Stefan Doczy, Pirka (AT); Michael Haindl, Hartberg (AT); Gerald Richter, Graz (AT); Birgit Weissensteiner, Graz (AT); Peter Kurcik, Sankt Nikolai im Sausal (AT); Manfred Marchl, Nestelbach (AT)

(73) Assignee: Samsung SDI Co., Ltd., Yongin-si (KR)

( * ) Notice: Subject to any disclaimer, the term of this patent is extended or adjusted under 35 U.S.C. 154(b) by 258 days.

(21) Appl. No.: 16/420,027

(22) Filed: May 22, 2019

(65) Prior Publication Data

US 2019/0372381 A1 Dec. 5, 2019

(30) Foreign Application Priority Data

Jun. 1, 2018 (EP) .................................. 18175438
Apr. 30, 2019 (KR) ..................... 10-2019-0050857

(51) Int. Cl.
*H02J 7/00* (2006.01)
*H02J 7/02* (2016.01)
*H01M 50/20* (2021.01)

(52) U.S. Cl.
CPC ......... *H02J 7/00718* (2020.01); *H01M 50/20* (2021.01); *H02J 7/022* (2013.01)

(58) Field of Classification Search
CPC .......... H02J 7/00718; H02J 7/022; H02J 7/02; H02J 7/00; H01M 50/20
See application file for complete search history.

(56) References Cited

U.S. PATENT DOCUMENTS 6,082,490 A * 7/2000 Rowland .............. E04B 1/8218
181/295
8,575,883 B2 * 11/2013 Sone ....................... H02M 1/10
318/800

(Continued)

FOREIGN PATENT DOCUMENTS

| EP | 3 316 440 A1 | 5/2018 | |
| EP | 3 327 895 A1 | 5/2018 | |
| WO | WO 2018147542 | * 8/2018 | ................ B60L 3/00 |

OTHER PUBLICATIONS

European Patent Office action for corresponding European Patent Application No. 18 175 438.3, dated Jul. 18, 2019, 3 pages.

(Continued)

*Primary Examiner* — Vuthe Siek
(74) *Attorney, Agent, or Firm* — Lewis Roca Rothgerber Christie LLP

(57) ABSTRACT

A battery system includes: a plurality of battery cells electrically connected to each other in series between a first node and a second node; an intermediate node dividing the plurality of battery cells into a first subset of battery cells and a second subset of battery cells; a step-down converter connected in parallel with the plurality of battery cells between the first node and the second node and having an output node; a first diode, an anode of which is connected to the intermediate node and a cathode of which is connected to the output node; and a control unit interconnected between the output node and the first node and configured to control the step-down converter.

15 Claims, 4 Drawing Sheets

(56) References Cited

U.S. PATENT DOCUMENTS

2002/0167291 A1    11/2002  Imai et al.
2013/0076152 A1*    3/2013  Nielsen .................. H02M 5/40
                                                         307/82
2016/0294182 A1    10/2016  Li et al.
2016/0380443 A1    12/2016  Jeon
2018/0043789 A1*    2/2018  Goetz ................. B60L 11/1879

OTHER PUBLICATIONS

Extended European Search Report issued in EP 18175438.3, dated Jul. 11, 2018, 7 pages.

* cited by examiner

BATTERY SYSTEM

CROSS-REFERENCE TO RELATED APPLICATION

This application claims priority to and the benefit of Korean Patent Application No. 10-2019-0050857, filed in the Korean Intellectual Property Office on Apr. 30, 2019, and European Patent Application No. 18175438.3, filed in the European Patent Office on Jun. 1, 2018, the entire contents of which are incorporated herein by reference.

BACKGROUND

1. Field

Aspects of embodiments of the present invention relate to a battery system including an integrated redundant power supply for a control unit.

2. Description of the Related Art

A rechargeable (or secondary) battery differs from a primary battery in that it is designed to be repeatedly charged and discharged, while the latter is designed to provide only an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction between the positive electrode, the negative electrode, and the electrolyte solution. The shape of the case, such as cylindrical or rectangular, depends on the battery's intended purpose.

Rechargeable batteries may be used as (e.g., may be used together as or may form) a battery module including a plurality of unit battery cells coupled to each other in series and/or in parallel to provide relatively high energy density for, as an example, driving a motor of a hybrid vehicle. For example, the battery module may be formed by interconnecting the electrode terminals of a plurality of unit battery cells to each other, the number and connection arrangement of the unit battery cells depending on a desired amount of power, to provide a high-power rechargeable battery, such as for an electric vehicle. One or more battery modules may be mechanically and electrically integrated, equipped with a thermal management system, and configured to communicate with one or more electrical consumers to form a battery system.

To meet the dynamic power demands of various electrical consumers connected to the battery system, a static control of battery power output and charging is often insufficient. Thus, steady or intermittent exchange of information between the battery system and the controllers of the electrical consumers may be employed. This information may include the battery system's actual state of charge (SoC), potential electrical performance, charging ability and internal resistance, as well as actual or predicted power demands or surpluses of the consumers.

For monitoring, controlling, and/or setting the aforementioned parameters, a battery system usually includes one or more battery management systems (BMSs), a battery management unit (BMU), and a cell supervision circuit (CSC). Such control units (e.g., controllers) may be an integral part of the battery system and disposed within a common housing or may be part of a remote control unit (e.g., a remote controller) communicating with the battery system via a suitable communication bus. These control units may perform various functions in the battery system. For example, a CSC is usually provided at a battery module level and is configured to measure cell voltages and temperatures and to provide cell balancing within the modules. A plurality of CSCs is usually connected for data transmission among each other and with a BMU. The BMU receives the voltage data from all of the battery modules, controls the battery system as a whole, and provides a communication interface to an exterior of the battery system to communicate with the electrical consumers via a suitable communication bus, such as a CAN or SPI interface.

To supply (e.g., to power) an electric motor of a vehicle, a relatively high voltage, such as 48 V, should be supplied by the battery system. In this case, the battery system may be connected to a 48 V board net (e.g., a 48 V circuit) to supply such electric consumers. However, the control units of the battery system usually operate at lower voltages. For example, a battery system may usually include an additional (e.g., a separate) 12 V supply that might be provided by a 12 V board net (e.g., a 12 V circuit) of the vehicle.

This approach is disadvantageous as security related functions of the battery system should be guaranteed at all times, and because the 12 V board system is drained even during non-active phases of the vehicle, a self-supplied battery system is desired.

SUMMARY

One or more of drawbacks of the prior art may be avoided or mitigated according to embodiments of the present invention. In one embodiment, a battery system is provided that includes a plurality of battery cells that are electrically connected to each other in series between a first node and a second node. The plurality of battery cells may also include battery cells connected to each other in parallel between the first node and the second node. For example, a plurality of submodules, each including a plurality of battery cells connected to each other in parallel, may be connected to each other in series between the first node and the second node. The added (or combined) voltage of all of the battery cells connected to each other in series between the first node and the second node is applied between the first node and the second node. For example, a voltage in a range between about 36 V and about 52 V, in some embodiments about 48 V, is applied between the first node and the second node of the battery system.

The battery system further includes an intermediate node dividing the plurality of battery cells in a first subset of battery cells and a second subset of battery cells. For example, the added (or combined) voltage of all of the battery cells connected to each other in series between the first node and the intermediate node is applied between the first node and the intermediate node, and the added (or combined) voltage of all of the battery cells connected to each other in series between the intermediate node and the second node is applied between the intermediate node and the second node. For example, the voltage applied between the first node and the intermediate node differs from the voltage applied between the second node and the intermediate node. The voltage applied between the first node and the intermediate node is in a range between about 12 V and about 36 V, in some embodiments in a range between about 12 V to about 24 V, and in some embodiments about 14 V. In some embodiments, all of the battery cells of the battery system are equal (e.g., output the same or substantially the same voltage).

In some embodiments, the first subset and the second subset of battery cells include the same number of battery cells connected to each other in series, and the nominal output voltage of the first subset is equal or substantially equal to that of the second subset of battery cells. Further, the first subset and the second subset may include the same number of battery cells connected to each other in parallel. Each subset may include half of all of the battery cells connected to each other in series between the first terminal and the second terminal. In other embodiments, the number of battery cells connected to each other in parallel and/or in series in the first subset differs from the number of battery cells connected to each other in parallel and/or in series in the second subset. The battery cells of the first subset may have a different capacity than the battery cells of the second subset of cells.

The battery system may further include a step-down converter that is connected in parallel with the plurality of battery cells between the first node and the second node. The step-down converter has an output node to which an output voltage of the step-down converter is provided. An input voltage of the step-down converter is the voltage applied between the first node and the second node, and the output voltage applied to the output node is lower than the input voltage. For example, the step-down converter is configured to convert an initial voltage (e.g., the input voltage) between the first node and the second node to a second voltage (e.g., the output voltage) that is applied to the output node, such as between the output node and the first node. The first node may be a ground potential (GND). The converted voltage (e.g., the output voltage) is lower than the initial voltage (e.g., the input voltage). The step-down converter may be one of a buck converter, a buck-boost converter, a forward converter, a flyback converter, a full bridge converter, and a push-pull converter, but the present invention is not limited thereto.

The battery system according to embodiments of the present invention may further include a first diode that is interconnected between the intermediate node and the output node. An anode of the first diode is connected to the intermediate node, and a cathode of the first diode is connected to the output node. Here, a first diode may refer to any component or circuitry interconnected between the intermediate node and the output node that allows an electric current to flow from the intermediate node to the output node but prevents an electric current from flowing from the output node to the intermediate node. The battery system according to embodiments of the present invention may further include a control unit (e.g., a controller) that is interconnected between the output node and the first node and that is configured to control the step-down converter by, for example, controlling the output voltage of the step-down converter.

The battery system according to embodiments of the present invention provides a dual power supply (e.g., a redundant power supply) for the control unit of the battery system. Thus, the control unit is reliably (e.g., always) supplied with a fraction of the total voltage of all of the battery cells of the battery system, and thus, under- and overvoltage with respect to the control electronics in the control unit is avoided. For example, the control unit is either supplied with the voltage of the first subset of battery cells via the first diode and the output node, or the control unit is supplied with the output voltage of the step-down converter (e.g., the stepped down voltage of all of the plurality of battery cells) via the output node. Hence, the battery system according to embodiments of the present invention provides a dual (or redundant) power supply for the electronics of the control unit as an integrated feature of the battery system.

The battery system according to embodiments of the present invention provides a cost-optimized approach for the electric supply of the electronics as a separate buck converter chip may be omitted between a high voltage domain of the battery system (e.g., all of the battery cells of the battery system) and the control unit. Further, the step-down converter of the battery system is configured to be switched off when the control unit is in a sleep mode, and the step-down converter does not provide an output voltage to the output node when the control unit is in the sleep mode. Hence, the sleep current (or standby current) of the battery system is reduced because the step-down converter is not operated permanently because the control unit is redundantly supplied via the first subset of battery cells. Further, a bleed out (e.g., a current leak) of the first subset is avoided by supplying the control unit via the step-down converter at least during active states of the control unit. Also, unwanted charging or overcharging of the first subset is avoided by the first diode.

In one embodiment, the first subset of battery cells supplies a voltage between about 18 V and about 26 V, such as about 14 V. Further, the output voltage of the step-down converter can be set to be between about 18 V and about 41 V, such as between about 18 V and about 36 V, such as about 24 V. The control unit may be configured to be safely supplied with a voltage between about 12 V and about 41 V, such as between about 18 V and about 36 V, such as about 14 V to about 24 V, although the control unit is configured to communicate with a 12 V domain. The intermediate node divides the plurality of battery cells such that the first subset of battery cells provides the operation voltage of the control unit. For example, the operation voltage of the control unit is applied between the intermediate and the first node.

According to one embodiment of the present invention, the control unit includes a system basis chip (SBC) and a battery management unit (BMU). The BMU is connected in series to the SBC. The SBC is connected to the output node, and the BMU is connected to the first node. Further, the SBC may be configured to supply the operation voltage of the BMU to a supply pin of the BMU. For example, the SBC may be configured to provide the power supply for all other control electronics of the battery system.

Also, the SBC may be configured to provide further functions, such as a wake-up function and/or a watchdog function. The SBC controls the battery system in a sleep mode of the additional control units and eventually activates additional control units. The BMU may be configured to provide at least one control function with respect to one or more battery cells of the battery system. In some embodiments, the BMU is configured to measure the voltage and/or temperature of one or more of the battery cells. The BMU may also be configured to provide active and/or passive balancing of at least some of the battery cells.

In some embodiments, the SBC may include an internal buck converter and may be safely supplied with an operation voltage between about 6 V and about 41 V. Hence, the step-down converter of the battery system may provide the SBC with a rather high output voltage while the SBC provides overvoltage protection to the BMU and also to additional control units.

The step-down converter of the battery system may include a third node and a first switch that is interconnected between the second node and the third node. The step-down converter may further include a second diode. An anode of the second diode is connected to the first node, and a cathode of the second diode is connected to the third node. Here, a second diode refers to any component or circuitry interconnected between the first node and the third node that allows an electric current to flow from the first node to the third node but prevents an electric current from flowing from the third node to the first node. The step-down converter may further include an inductor that is interconnected between the third node and the output node and may further include a capacitor that is interconnected between the inductor and the first node. For example, the step-down converter may be a buck converter. In such an embodiment, the control unit, such as the BMU, is configured to control the first switch of the buck converter. The control unit controls the duty cycle of the buck converter and, hence, the output voltage, via PMW. Further, when the control unit is in a sleep mode, the first switch is configured to be set to a non-conductive state. For example, in such sleep mode, the SBC is configured to provide no supply voltage to the BMU and the BMU does not set the first switch conductive (e.g., the first switch is set to a non-conductive state). The first switch may be a MOSFET, such as a PNP MOSFET, and the BMU may control the signal applied to the gate of the MOSFET.

In another embodiment, the battery system may further include a charging path that is connected in parallel with the first diode and that includes a second switch. For example, the charging path circumvents the first diode and allows for an electric current to flow from the output node to the intermediate node according to the second switch's switching state. By controlling the second switch, the output voltage of the step-down converter may be utilized for active balancing (e.g., active cell balancing) of the battery system. When the second switch is set to a non-conductive state, the output voltage of the step-down converter supplies (e.g., solely supplies) the control unit (according to the potential at the output node), but when the second switch is set to a conductive state, the output voltage of the step-down converter charges the first subset of battery cells (according to the potential at the output node). The battery system according to embodiments of the present invention thereby allows for integrated balancing between the first subset and the second subset of battery cells. Hence, eventual charging losses of the first subset of battery cells due to supplying the control unit when the control unit is in a sleep mode may be evened out once the control unit is activated.

In one embodiment, the charging path may further include a constant current source that is interconnected between the cathode of the first diode and the second switch. Instead of the constant current source, a current limiter may be used. Hence, overcharging of the first subset of battery cells may be effectively avoided. In some embodiments, the second switch is a PNP transistor, with the emitter of the PNP transistor being connected to the cathode of the first diode and the collector of the PNP transistor being connected to the anode of the first diode. In such an embodiment, the current limiter is realized in that a basis of the PNP transistor is connected to the emitter of the PNP transistor via a resistor network as well as to a collector of an additional NPN transistor, an an emitter of the NPN transistor is connected to the first node. By controlling the basis of the NPN transistor, the second switch is realized, while the both transistors and the resistor network together function as the current limiter. For example, the control unit controls the signal applied to the basis or gate of the NPN transistor and controls the second switch.

Further, the charging path may include a fourth node that is interconnected between the anode of the first diode and the second switch. Hence, a current from among or a voltage at the fourth node is indicative of the correct function of the first switch (e.g., the buck converter) and/or the second switch. Further, the fourth node may be connected to an input pin, such as a diagnosis input pin, of the BMU. In such an embodiment, the BMU may be configured to perform a diagnosis of the first switch and/or the second switch based on a voltage or current signal that is applied to the input pin. The BMU may be further configured to output a control signal based on the diagnosis, such as when a failure of the first switch and/or the second switch is detected. Based on the control signal, the control unit or another electronic component of the battery system may, for example, switch off the battery system and/or output a warning.

Further, a first resistor may be interconnected between the fourth node and the anode of the first diode, and a second resistor as well as a third resistor may both be interconnected between the fourth node and the first node. The input pin of the BMU is then connected to a fifth node that is located between the second resistor and the third resistor. Then, the diagnosis signal applied to the input pin is the voltage drop due to the first to third resistors.

In some embodiments, the battery system may include an additional load that is interconnected between the output node and the first node. This additional load is then supplied via the output node when the control unit is active and the step-down converter supplies the output node. A third switch may be interconnected between the additional load and the first node, and in some embodiments, the third switch is controlled by the control unit and/or is configured to be set non-conductive when the control unit is in a sleep mode. In an embodiment in which the control unit includes a SBC with an internal buck converter, the output voltage of the step-down converter applied to the output node may be adapted to (e.g., modified to match or substantially match) the operational voltage of the additional load, as long as this voltage is within the safe operation voltage of the SBC.

Further, a high voltage load may be interconnected between the first node and the second node. In some embodiments, the battery system may be configured to be connected to a high voltage load outside (e.g., external to) the battery system that is to be electrically interconnected between the first node and the second node. In an electric vehicle, the high voltage load may be the electric motor or any other component that is to be supplied by the high voltage domain. In such an embodiment, the additional load may be a relay that is configured to control a fourth switch, and the fourth switch may be interconnected between the high voltage load and one of the first node and the second node. For example, a battery disconnect unit (BDU) may be realized by the combination of the relay and the fourth switch. The battery system according to embodiments of the present invention allows the relay to be supplied with either a switching or holding current while the control unit (SBC) is concurrently (or simultaneously) supplied with its operation voltage. In some embodiments, the control unit, such as the BMU, is configured to control at least one of the third switch and the fourth switch.

Further aspects and features of the present invention are disclosed in the dependent claims and in the following description.

BRIEF DESCRIPTION OF THE DRAWINGS

Aspects and features of the present invention will become apparent to those of ordinary skill in the art by describing, in detail, exemplary embodiments thereof with reference to the attached drawings, in which.

DETAILED DESCRIPTION

Figure 1:
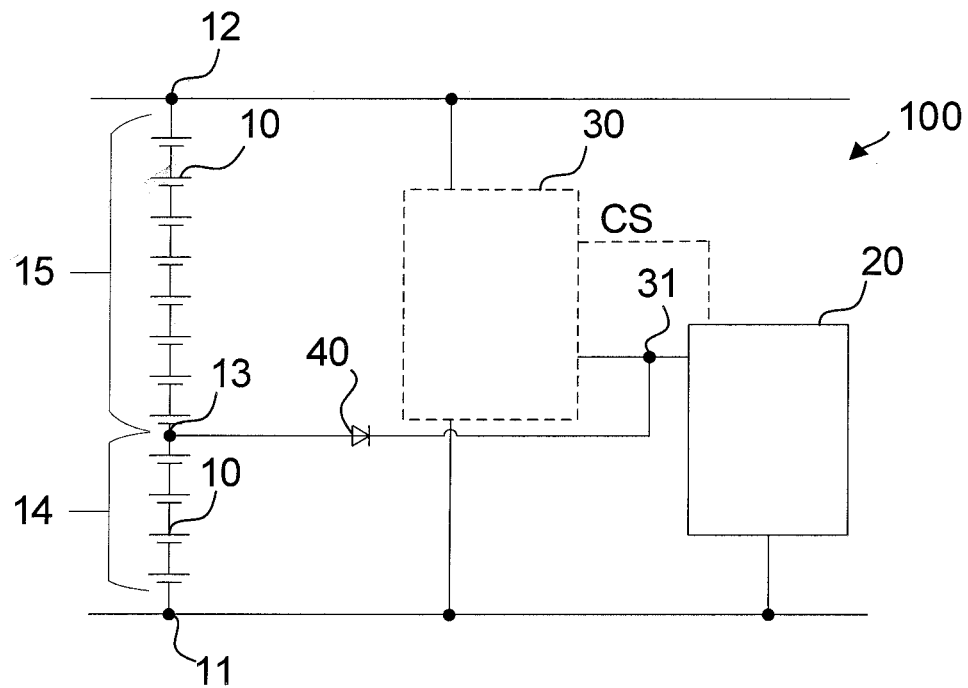
FIG. 1 schematically illustrates a battery system according to a first embodiment.

Reference will now be made, in detail, to example embodiments of the present invention, which are illustrated in the accompanying drawings. Aspects and features of the exemplary embodiments, and implementation methods thereof, will be described with reference to the accompanying drawings. In the drawings, like reference numerals denote like elements, and redundant descriptions thereof may be omitted. The present invention, however, may be embodied in various different forms and should not be construed as being limited to only the illustrated embodiments described herein. Rather, these embodiments are provided as examples so that this disclosure will be thorough and complete, and will fully convey the aspects and features of the present invention to those skilled in the art.

Accordingly, processes, elements, and techniques that are not considered necessary to those having ordinary skill in the art to have a complete understanding of the aspects and features of the present invention may not be described. In the drawings, the relative sizes of elements, layers, and regions may be exaggerated for clarity.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise. Expressions such as "at least one of," when preceding a list of elements, modify the entire list of elements and do not modify the individual elements of the list.

It will be understood that although the terms "first" and "second" are used to describe various elements, these elements should not be limited by these terms. These terms are only used to distinguish one element from another element. For example, a first element may be named a second element and, similarly, a second element may be named a first element without departing from the scope of the present invention.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

Also, the term "exemplary" is intended to refer to an example or illustration. As used herein, the terms "use," "using," and "used" may be considered synonymous with the terms "utilize," "utilizing," and "utilized," respectively. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

As used herein, the term "substantially," "about," and similar terms are used as terms of approximation and not as terms of degree and are intended to account for the inherent deviations in measured or calculated values that would be recognized by those of ordinary skill in the art. Further, when the term "substantially" is used in combination with a feature that could be expressed using a numeric value, the term "substantially" denotes a range of +/−5% of the value centered on the value.

FIG. 1 schematically illustrates a battery system 100 according to a first embodiment of the present invention. The battery system 100 includes a plurality of battery cells (e.g., twelve battery cells) 10 that are connected to each other in series between a first node 11 and a second node 12. Each battery cell 10 provides a voltage of about 4 V so that a voltage of about 48 V is applied between the first node 11 and the second node 12. The stack of battery cells 10 further includes an intermediate node 13 that divides the cell stack into a first subset 14 of battery cells 10 and a second subset 15 of battery cells 10. Therein, four battery cells 10 are disposed between the first node 11 and the intermediate node 13, and eight battery cells 10 are disposed between the intermediate node 13 and the second node 12, but the present invention is not limited thereto. Hence, in the illustrated embodiment, a voltage of about 16 V is applied between the first node 11 and the intermediate node 13, and a voltage of about 32 V is applied between the intermediate node 13 and the second node 12.

A step-down converter 30 is connected in parallel with the battery cells 10 between the first node 11 and the second node 12 such that the full voltage of about 48 V is the input voltage of the step-down converter 30. The step-down converter 30 includes an output node 31 to which an output voltage of the step-down converter 30 is applied. For example, the output voltage of the step-down converter 30 is applied between the output node 31 and the first node 11, and the first node 11 is set to ground potential GND. The output node 31 of the step-down converter 30 is connected to the intermediate node 13 via a first diode 40. The anode of the first diode 40 is connected to the intermediate node 13, and the cathode of the first diode 40 is connected to the output node 31.

A control unit (e.g., a controller) 20 is interconnected between the output node 31 and the first node 11. The control unit 20 is configured to output a control signal CS to the step down converter 30 to control the step-down converter 30, for example, to control the output voltage of the step-down converter 30. When the step-down converter 30 is switched off, the control unit 20 is solely supplied (e.g., is solely supplied with electricity) via the first diode 40 and the output node 31. For example, the voltage of the first subset 14 of battery cells 10, for example, about 16 V, is applied to the control unit 20 when the step-down converter 30 is switched off. When the step-down converter 30 is switched on, an output voltage of the step-down converter 30 that is stepped down from the input voltage of about 48 V is applied to the output node 31. When the output voltage of the step-down converter 30 at output node 31 exceeds the voltage of the first subset 14 of battery cells 10, a current from the output node 31 towards the intermediate node 13 is blocked by the first diode 40, and the control unit 20 is supplied solely by the step-down converter 30. Thus, a redundant dual power supply for the control unit 20 is provided by battery system 100, in which overcharging of the first subset 14 of battery cells 10 is prevented by first diode 40. In the battery system 100, the step-down converter 30 is switched on solely when the control unit 20 is active and is switched off if the control unit 20 is in a sleep mode.

Figure 2:
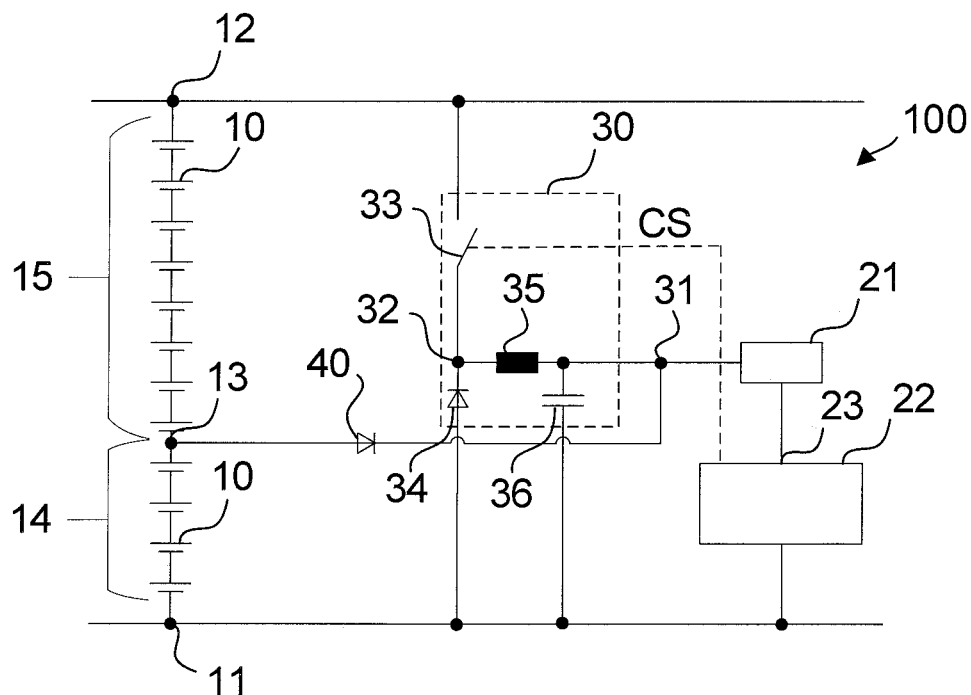
FIG. 2 schematically illustrates a battery system according to a second embodiment.

FIG. 2 schematically illustrates a battery system 100 according to a second embodiment of the present invention. In FIG. 2, the same reference signs as those used in FIG. 1 refer to the same or substantially similar components as describe above with respect to FIG. 1 and a repeated description thereof may be omitted.

In the battery system 100 shown in FIG. 2, the step-down converter 30 is a buck converter 30 that includes a third node 32 and a first switch 33 interconnected between the second node 12 and the third node 32. The buck converter 30 further includes a second diode 34. The anode of the second diode 34 is connected to the first node 11, and the cathode of the second diode 34 is connected to the third node 32. The buck converter 30 further includes an inductor 35 interconnected between the third node 32 and the output node 31 and a capacitor 36 interconnected between the inductor 35 and the first node 11 and in parallel with the second diode 34.

The control unit shown in FIG. 2 includes a system basis chip (SBC) 21 connected in series with a battery management unit (BMU) 22. The SBC 21 is configured to receive either the voltage of the first subset 14 of battery cells 10 or the output voltage of the step-down converter 30 via the output node 31 and is configured to supply an operation voltage (e.g., the operational voltage) of the BMU 22 to the BMU 22 via a supply pin 23 of the BMU 22. The operation voltage of the BMU 22 is about 12 V, which is lower than the voltage applied to the output node 31. The BMU 22 is further configured to output a control signal CS to the first switch 33 of the buck converter 30 that is set into a conductive state (e.g., is closed) in response to receiving the control signal CS and is set into a non-conductive state (e.g., is opened) in response to not receiving the control signal CS. The BMU 22 controls the duty cycle of the buck converter 30 by pulse width modulation (PWM) and the output voltage supplied to output node 31.

In sleep mode, the BMU 22 does not output the control signal CS to the first switch 33 (e.g., continuously does not output the control signal CS to the first switch 33), and thus, the buck converter 30 is switched off (e.g., does not conduct electricity). When the buck converter 30 is switched off, the SBC 21 is supplied by the first subset 14 of battery cells 10 via the first node 31 and may not provide the operation voltage of the BMU 22 to the BMU 22. When a wake up event is recognized by the SBC 21, for example, receiving a wake up signal or by determining that a reference time (e.g., predetermined time) has elapsed, the SBC 21 may transmit a wake up signal to the BMU 22 by, for example, providing the operational voltage of the BMU 22 to the BMU 22 for a short period of time. Then, the BMU 22 starts controlling the first switch 33 (e.g., the BMU 22 transmits the control signal CS to the first switch 33) and hence, the buck converter 30 starts to supply a voltage to the SBC 21 via the output node 31. The voltage supplied by the buck converter 30 is sufficient to provide (e.g., to continuously provide) the BMU 22 with its operation voltage.

Figure 3:
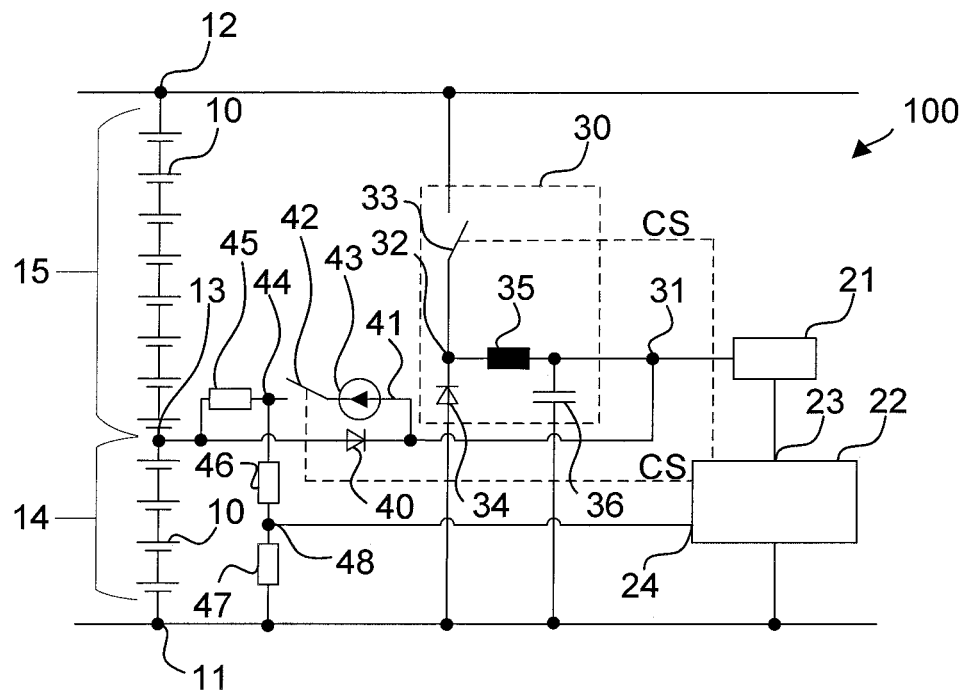
FIG. 3 schematically illustrates a battery system according to a third embodiment.

FIG. 3 schematically illustrates a battery system 100 according to a third embodiment of the present invention. In FIG. 3, the same reference signs as those used in FIGS. 1 and 2 refer to the same or substantially similar components, and a repeated description thereof may be omitted.

The battery system 100 shown in FIG. 3 further includes a charging path 41 connected in parallel with the first diode 40. The charging path 41 includes a constant current source 43 and a second switch 42. The constant current source 43 is connected to the cathode of the first diode 40, and the second switch 42 is connected to the anode of the first diode 40. The BMU 22 shown in FIG. 3 is further configured to control the second switch 42 by outputting another control signal CS to the second switch 42. The charging path 41 allows for the charging of the first subset 14 of battery cells 10 by the output voltage of the buck converter 30 via the output node 31.

When the first switch 33 is set into the non-conductive state (e.g., in sleep mode), the SBC 21 is supplied by only the first subset 14 of battery cells 10 via the first diode 40 and the output node 31. Hence, the first subset 14 of battery cells 10 is drained more than the second subset 15 of battery cells 10. When the SBC 21 and the BMU 22 wake up, the BMU 22 controls the first switch 33 to be set to the conductive state and the non-conductive state in an alternating manner to operate the buck converter 30, and hence, the buck converter 30 supplies a voltage to the output node 31. When the voltage supplied by the buck converter 30 exceeds the voltage provided by the first subset 14 of battery cells 10, charging of the first subset 14 of battery cells 10 can be enabled by setting the second switch 42 into a conductive state. Thus, a constant current flows from the output node 31 via the charging path 41 to the first subset 14 of battery cells 10 and charges them.

The charging path 41 further includes a fourth node 44 interconnected between the second switch 42 and the anode of the first diode 40. A first resistor 45 is connected between the fourth node 44 and the intermediate node 13. Further, a second resistor 46 and a third resistor 47 are interconnected between the fourth node 44 and the first node 11. A fifth node 48 is located between the second resistor 46 and the third resistor 47 and is connected to a diagnosis input pin 24 of the BMU 22. The signal at the diagnosis input pin 24 corresponds to the voltage drop across the resistors 45, 46, and 47 due to the charging current from the output node 31 to the first subset 14 of battery cells 10. This signal is indicative of both the functioning (e.g., the correct functioning) of the buck converter 30, including of the first switch 33, and of the second switch 42. Hence, the signal at the diagnosis input pin 24 may be used to determine whether or not an erroneous state is present in the battery system 100 that may necessitate emergency shutting off of the battery system 100.

When the second switch 42 is set to be in non-conductive state, the control units 21 and 22 shown in FIG. 3 are operated with dual power supplies as described above with respect to FIGS. 1 and 2.

Figure 4:
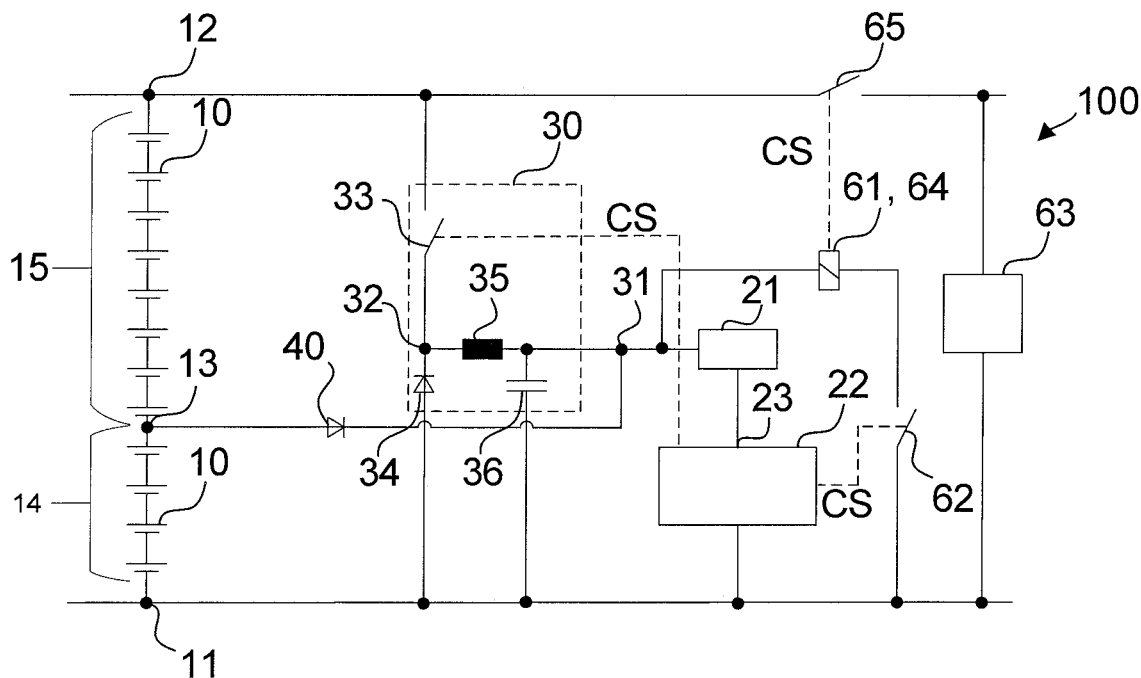
FIG. 4 schematically illustrates a battery system according to a fourth embodiment.

FIG. 4 schematically illustrates a battery system 100 according to a fourth embodiment of the present invention. In FIG. 4, the same reference signs as those used in FIGS. 1-3 refer to the same or substantially similar components, and a repeated description thereof may be omitted.

The battery system 100 shown in FIG. 4 further includes a high voltage load 63 that is interconnected between the first node 11 and second node 12 downstream of all the other components of the battery system 100 and/or outside of (e.g., external to) the battery system 100. The high voltage load 63 might be an electric motor of an electric vehicle that includes the battery system 100.

The battery system 100 further includes an additional load 61 that is interconnected between the output node 31 and the first node 11 in parallel with the control units (e.g., the SBC 21 and the BMU 22). In FIG. 4, the additional load 61 is depicted as a relay 64. A third switch 62 is interconnected between the additional load 61/relay 64 and the first node 11. The third switch 62 is controlled by the BMU 22 such that the BMU 22 may thus control that the output voltage of the buck converter 30 that is supplied to the relay 64 via the output node 31. The relay 64 controls a fourth switch 65 that is interconnected between the second node 12 and the high voltage load 63. By controlling the third switch 62 to be in a conductive state, the relay 64 sets the fourth switch 65 to be in a non-conductive state. Hence, the BMU 22, which controls the third switch 62, may act as a battery disconnect unit (BDU) for disconnecting the battery system 100 from its electric consumers in case of an abnormal operation state of the battery system 100, for example, in response to receiving a signal indicative of a fault state on the diagnosis input pin 24.

When the battery system 100 is in sleep mode (e.g., when the BMU 22 is in sleep mode), the SBC 21 is supplied solely by the first subset 14 of battery cells 10 via the first diode 40 and the output node 31. The first switch 33 and the third switch 62 are set to be non-conductive (e.g., open) while the fourth switch 65 may be set to be either conductive or non-conductive. To wake up the battery system 100, the SBC 21 supplies an operation voltage of the BMU 22 to the BMU 22 for a short time, for example, by a controlled discharge of a capacitor of the SBC 21 or the like. Then, the BMU 22 starts to control the first switch 33 to operate the buck converter 30, and thus, a higher voltage is applied to the output node 31 by the buck converter 30. Also, the BMU 22 may control the fourth switch 65 to be set in a conductive state to supply the high voltage load 63 from the battery system 100. When an abnormal state is detected, the BMU 22 may close the third switch 62, which provides the output voltage of the buck converter 30 at the output node 31 to the relay 64. Further, the BMU 22 may control the first switch 33 such that the voltage at the output node 31 is increased to the switching voltage of the relay 64. This voltage may exceed the operation voltage of the BMU 22 but still be within the safe operation voltage range of the SBC 21, which then supplies an adequate operation voltage to the BMU 22. In response to receiving the switching voltage from the output node 31, the relay 64 sets the fourth switch 65 to be in a non-conductive state and, hence, separates (e.g., electrically separates) the battery system 100 and the high voltage load 63 from each other.

Figure 5:
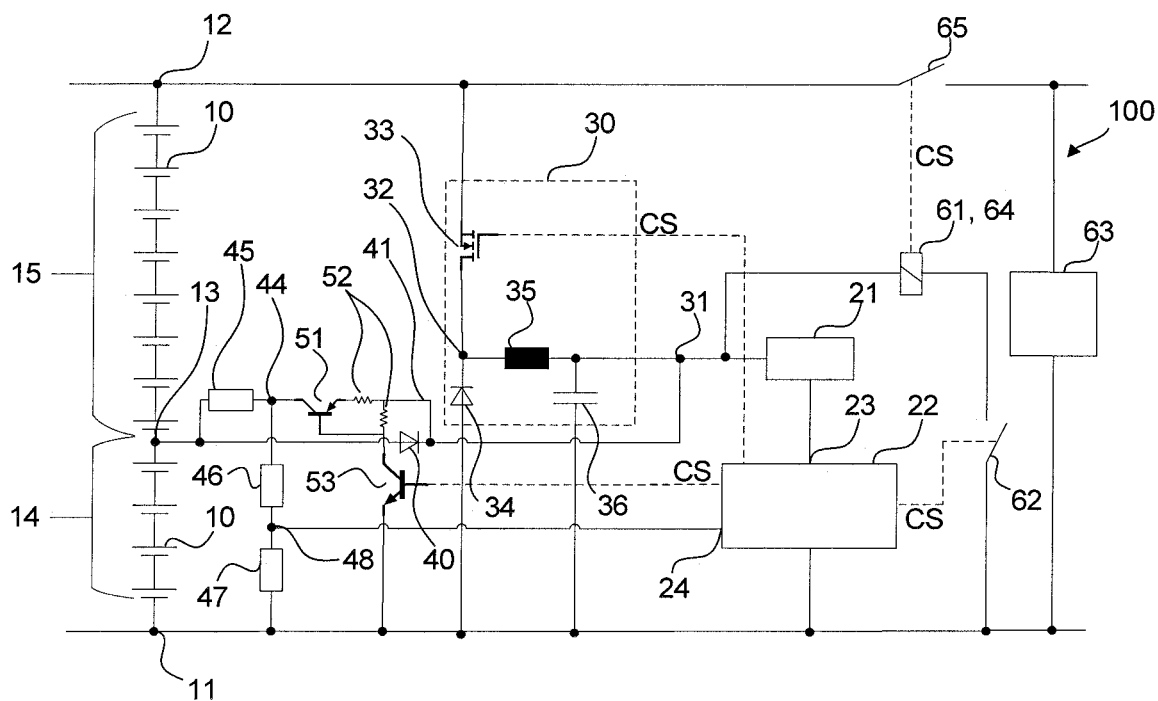
FIG. 5 schematically illustrates a battery system according to a fifth embodiment.

FIG. 5 schematically illustrates a battery system 100 according to a fifth embodiment of the present invention. In FIG. 5, the same reference signs as those used in FIGS. 1-4 refer to the same or substantially similar components, and a repeated description thereof may be omitted.

In the battery system 100 shown in FIG. 5, the first switch 33 is a MOSFET, the gate voltage of which is controlled by the BMU 22. Further, the second switch is a PNP transistor 51, the basis of which is connected to its emitter via a resistor network 52 and to the collector of a NPN transistor 53, the emitter of which is connected to the first node 11 and the current at the basis of which is controlled by the BMU 22. The combination of the PNP transistor 51, the resistor network 52, and the NPN transistor 53 provides a second switch and a current limiter in the charging path 41, and the switching signal for allowing a charging current through the charging path 41 is provided to the basis of NPN transistor 53.

Figure 6:
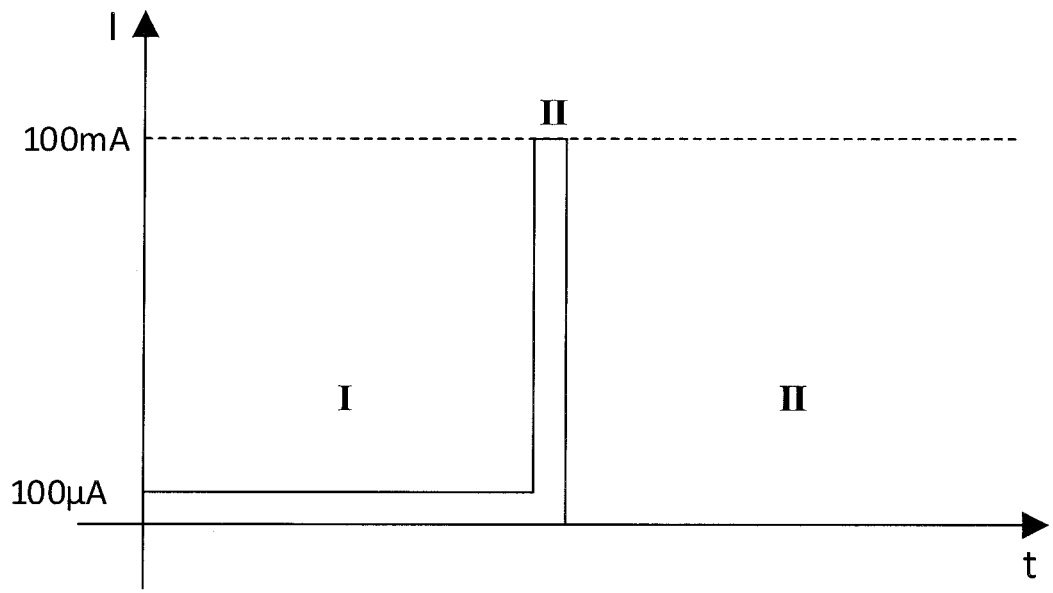
FIG. 6 is a graph illustrating a current across a first diode.

FIG. 6 is a graph illustrating a current across the first diode 40 of the battery system 100 shown in FIG. 5. When battery system 100 and BMU 22 are in sleep mode, the sleep current is about 100 pA, which is the current required by the SBC 21 to perform basic watch-dog functions and to provide a wake up functionality. During a short start-up phase, which lasts only about a few milliseconds, the SBC 21 draws an increased current of up to about 100 mA to wake up the BMU 22. Once the BMU 22 is woken up, it operates the buck converter 30 via the first switch 33, and thus, an output voltage that exceeds the voltage of the first subset 14 of battery cells 10 is supplied to the output node 31. Hence, no current flows via the first diode 40. When the current limiter is the transistors 51 and 53 and the resistor network 52 limits the current through the charging path 41 to be about 30 mA, then the charge misbalance due to about one month of sleep mode may be equalized by charging the first subset 14 of battery cells 10 for a total charging time (t=(24*30*100 pA)/(30 mA)) of about 2.4 hours.

Figure 7:
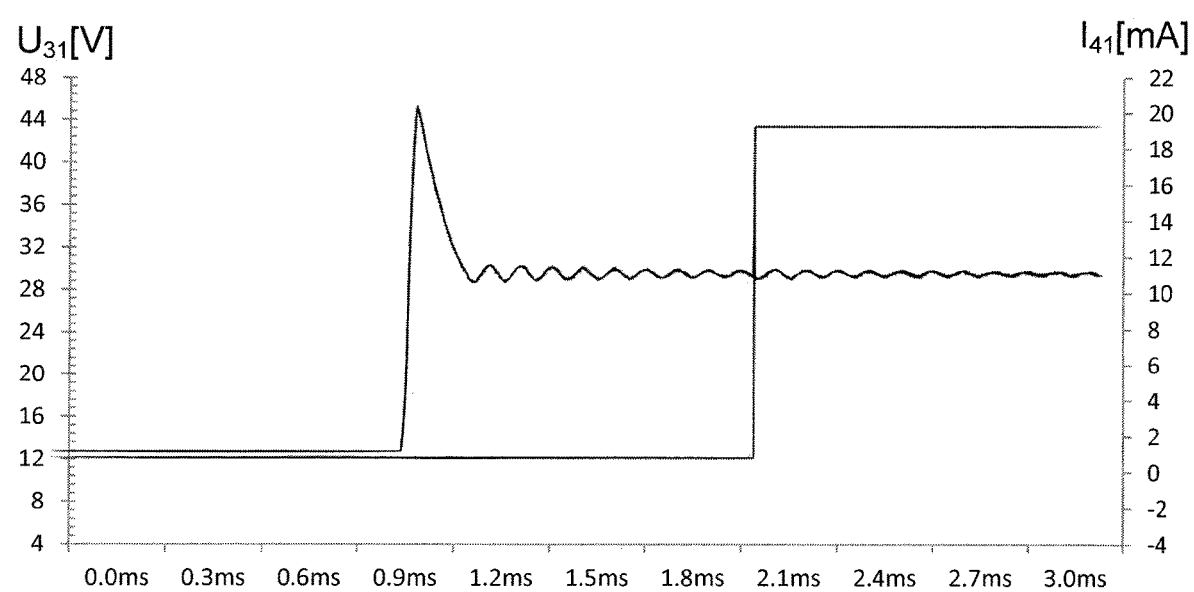
FIG. 7 is a graph illustrating a voltage at an output node and a current across a charging path.

FIG. 7 is a graph illustrating a voltage at the output node 31 and a current across the charging path 41 of the battery system 100 shown in FIG. 5. The upper line (at the left side of the graph) is the output voltage of the initially switched-off buck converter 30 at the output node 31. At approximately 1 ms, the buck converter 30 is switched on and a voltage transient occurs at the output node 31. However, such a transient may be avoided by the BMU 22 appropriately controlling the first switch 33. Then, the buck converter 30 may provide a nearly constant output voltage of about 28 V to the output node 31.

The current across the charging path 41 is initially zero until after approximately 2 ms when the base current of the NPN transistor 53 is controlled to supply the voltage of the first node 11 to the basis of the PNP transistor 51 to set its channel to be conductive. The resistor network 52 then allows a constant charging current of about 18 mA via the charging path 41.

The electronic or electric devices, control units, and/or any other relevant devices or components according to embodiments of the present invention described herein may be implemented by utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, for example, on a PCB or another kind of circuit carrier. The conducting elements may include metallization, for example, surface metallizations and/or pins, and/or may include conductive polymers or ceramics. Further, electrical energy (e.g., electricity) may be transmitted via wireless connections, for example, by using electromagnetic radiation and/or light.

Further, the various components of these devices may be a process or thread running on one or more processors in one or more computing devices, executing computer program instructions and interacting with other system components to perform the various functionalities described herein. The computer program instructions are stored in a memory, which may be implemented in a computing device by using a standard memory device, such as a random access memory (RAM). The computer program instructions may also be stored in other non-transitory computer readable media, such as a CD-ROM, flash drive, or the like.

Also, a person of skill in the art would recognize that the functionality of various electrical devices may be combined or integrated into a single electrical device, or the functionality of a particular electrical device may be distributed across one or more other electrical devices without departing from the scope of the present invention.

SOME REFERENCE SIGNS

| | |
|---|---|
| 10 | battery cell |
| 11 | first node |
| 12 | second node |
| 13 | intermediate node |
| 14 | first subset of battery cells |
| 15 | second subset of battery cells |
| 20 | control unit |
| 21 | system basis chip (SBC) |
| 22 | battery management unit (BMU) |
| 23 | supply pin |
| 24 | input pin |
| 30 | step-down converter |
| 31 | output node |
| 32 | third node |
| 33 | first switch |
| 34 | second diode |
| 35 | inductor |
| 36 | capacitor |
| 37 | MOSFET transistor |
| 40 | first diode |
| 41 | charging path |
| 42 | second switch |
| 43 | constant current source |
| 44 | fourth node |
| 45 | first resistor |
| 46 | second resistor |
| 47 | third resistor |
| 48 | fifth node |
| 51 | PNP transistor |
| 52 | resistor network |
| 53 | NPN transistor |
| 61 | additional load |
| 62 | third switch |
| 63 | high voltage load |
| 64 | relay |
| 65 | fourth switch |

What is claimed is:

1. A battery system comprising:
    a plurality of battery cells electrically connected to each other in series between a first node and a second node;
    an intermediate node dividing the plurality of battery cells into a first subset of battery cells and a second subset of battery cells;
    a step-down converter connected in parallel with the plurality of battery cells between the first node and the second node and having an output node;
    a first diode, an anode of which is connected to the intermediate node and a cathode of which is connected to the output node; and
    a control unit interconnected between the output node and the first node and configured to control the step-down converter.

2. The battery system according to claim 1, wherein the step-down converter is configured to be switched off when the control unit is in a sleep mode.

3. The battery system according to claim 1, wherein the control unit comprises a system basis chip and a battery management unit connected to each other in series, and
    wherein the system basis chip is connected to the output node, and the battery management unit is connected to the first node.

4. The battery system according to claim 3, wherein the system basis chip is configured to supply an operation voltage of the battery management unit to a supply pin of the battery management unit, and
    wherein the system basis chip comprises an internal buck converter.

5. The battery system according to claim 1, wherein the step-down converter comprises:
    a third node;
    a first switch interconnected between the second node and the third node;
    a second diode, an anode of which is connected to the first node and a cathode of which is connected to the third node;
    an inductor interconnected between the third node and the output node; and
    a capacitor interconnected between the inductor and the first node.

6. The battery system according to claim 5, wherein the first switch is a MOSFET transistor.

7. The battery system according to claim 1, further comprising a charging path connected in parallel with the first diode, the charging path comprising a second switch.

8. The battery system according to claim 7, wherein the charging path further comprises a constant current source or a current limiter interconnected between the cathode of the first diode and the second switch.

9. The battery system according to claim 7, wherein the second switch is a PNP transistor, an emitter of which is connected to the cathode of the first diode and a collector of which is connected to the anode of the first diode.

10. The battery system according to claim 9, wherein a basis of the PNP transistor is connected to the emitter of the PNP transistor via a resistor network and to a collector of a NPN transistor, and
    wherein an emitter of the NPN transistor is connected to the first node.

11. The battery system according to claim 7, wherein the control unit comprises a system basis chip and a battery management unit connected to each other in series, and
    wherein the charging path further comprises a fourth node interconnected between the anode of the first diode and the second switch, the fourth node being connected to an input pin of the battery management unit.

12. The battery system according to claim 11, further comprising:
    a first resistor interconnected between the fourth node and the intermediate node and a second resistor; and a third resistor interconnected between the fourth node and the first node,
wherein the input pin of the battery management unit is connected to a fifth node between the second resistor and the third resistor.

13. The battery system according to claim 1, further comprising:
an additional load interconnected between the output node and the first node; and
a third switch interconnected between the additional load and the first node.

14. The battery system according to claim 13, further comprising a high voltage load or being configured to be connected to a high voltage load outside of the battery system,
wherein the high voltage load is interconnected between the first node and the second node, and
wherein the additional load is a relay configured to control a fourth switch interconnected between the high voltage load and one of the first node and the second node.

15. The battery system according to claim 14, further comprising a charging path connected in parallel with the first diode, the charging path comprising a second switch,
wherein the step-down converter comprises a third node and a first switch interconnected between the second node and the third node, and
wherein the control unit is configured to control at least one of the first switch, the second switch, the third switch, and the fourth switch.

* * * * *